(12) United States Patent
Dirks et al.

(10) Patent No.: US 12,706,492 B2
(45) Date of Patent: Aug. 11, 2026

(54) PERMANENT MAGNET ENERGY CONVERTOR

(71) Applicant: Rubicon Energy BV, Wijchen (NL)

(72) Inventors: Lars Adolf Hendrik Dirks, Wijchen (NL); Peter Mösli, Wijchen (NL); René Rudolf Durrer, Wijchen (NL); Roger Beda Murer, Wijchen (NL)

(73) Assignee: RUBICON ENERGY BV, Wijchen (NL)

( * ) Notice: Subject to any disclaimer, the term of this patent is extended or adjusted under 35 U.S.C. 154(b) by 546 days.

(21) Appl. No.: 17/999,782

(22) PCT Filed: May 25, 2021

(86) PCT No.: PCT/NL2021/050329

§ 371 (c)(1),
(2) Date: Nov. 23, 2022

(87) PCT Pub. No.: WO2021/242095

PCT Pub. Date: Dec. 2, 2021

(65) Prior Publication Data

US 2023/0246493 A1 Aug. 3, 2023

(30) Foreign Application Priority Data

May 25, 2020 (NL) ..................................... 2025668

(51) Int. Cl.
*H02K 1/17* (2006.01)
*H02K 1/02* (2006.01)
(Continued)

(52) U.S. Cl.
CPC ................ *H02K 1/17* (2013.01); *H02K 1/02* (2013.01); *H02K 1/223* (2013.01); *H02K 1/2753* (2013.01); *H02K 11/30* (2016.01)

(58) Field of Classification Search
CPC ........... H02K 1/17; H02K 1/02; H02K 1/223; H02K 1/2753; H02K 11/30; H02K 53/00; H02K 21/04
See application file for complete search history.

(56) References Cited

U.S. PATENT DOCUMENTS 4,571,528 A * 2/1986 McGee ................. H02K 53/00 318/400.41
6,184,605 B1 2/2001 Kim
(Continued)

FOREIGN PATENT DOCUMENTS

CN 104852629 A * 8/2015 ........... H02N 11/006
CN 104852630 A * 8/2015 ........... H02K 49/106
(Continued)

OTHER PUBLICATIONS

Betancourt-Cantera J.A. et al., Magnetic properties and crystal structure of elemental cobalt powder modified by high-energy ball milling, Jour Material Research and Tech., vol. 8, Issue 5, September-Oct. 2019, pp. 4995-5003. (Year: 2019).*
(Continued)

*Primary Examiner* — Jeffrey T Carley
*Assistant Examiner* — Jose K Abraham
(74) *Attorney, Agent, or Firm* — DINSMORE & SHOHL LLP

(57) ABSTRACT

A permanent magnet energy converter is described wherein the converter comprises: a stator structure including a stator magnet having a spiral geometry; the stator magnet having a U-shaped cross-section, a first leg of the U-shaped cross-section forming a first magnetic pole and a second leg of the U-shaped cross-section forming a second magnetic pole; an elongated rotor structure having a first and second end being positioned within the stator structure, the rotor structure being configured to rotate about rotation axis, wherein the rotor structure includes: first and second elongated core
(Continued)

elements of a magnetizable material, a first end and second end of the first core element being aligned with the first magnetic pole of the stator magnet and a first end and second end of the second core element being aligned with second magnetic pole of the stator magnet; one or more permanent magnets arranged to magnetize the first and second elongated core elements; and, a first magnetic coil structure for reversing the magnetic polarity of the first end of the first and second core elements and a second magnetic coil structure for reversing the magnetic polarity of the second end of the first and second core elements.

10 Claims, 8 Drawing Sheets

(51) Int. Cl.

| | |
|---|---|
| ***H02K 1/22*** | (2006.01) |
| ***H02K 1/2753*** | (2022.01) |
| ***H02K 11/30*** | (2016.01) |

(56) References Cited

U.S. PATENT DOCUMENTS

| | | | | |
|---|---|---|---|---|
| 2005/0029887 A1* | 2/2005 | Fecera | H02K 53/00 | 310/156.32 |
| 2005/0040728 A1* | 2/2005 | Hirzel | H02K 21/24 | 310/191 |
| 2007/0018512 A1* | 1/2007 | Yasuda | F16H 25/24 | 310/80 |
| 2023/0246493 A1* | 8/2023 | Dirks | H02K 21/04 | 29/596 |

FOREIGN PATENT DOCUMENTS

| | | | |
|---|---|---|---|
| EP | 0130048 | A2 | 1/1985 |
| JP | 55144783 | A | 11/1980 |
| WO | 199104603 | A1 | 4/1991 |
| WO | 1991004603 | A1 | 4/1991 |

OTHER PUBLICATIONS

International Search Report in reference to PCT/NL2021/050329 filed May 25, 2021.

Written Opinion n reference to PCT/NL2021/050329 filed May 25, 2021.

* cited by examiner

PERMANENT MAGNET ENERGY CONVERTOR

CROSS REFERENCES TO RELATED APPLICATIONS

This application is a national-stage application under 35 U.S.C. § 371 of International Application No. PCT/NL2021/050329, filed May 25, 2021, which International Application claims benefit of priority to Netherlands Patent Application No. 2025668, filed May 25, 2020.

FIELD OF THE INVENTION

The invention relates to a permanent magnet energy convertor and, in particular, though not exclusively, to methods and systems for converting energy based on a spiral-shaped permanent magnet.

BACKGROUND OF THE INVENTION

A permanent magnet convertor such as a permanent magnet motor uses permanent magnets in a stator structure to provide the magnetic fields that interact with the magnetic fields of the rotor to produce a torque that allows rotation of the rotor. Typically, a permanent magnet motor provides significant efficiently improvements over induction-type motors. A disadvantage of a conventional permanent magnet motor is however that it requires a continuous ac current through the stator coils to produce the required magnetic fields of the rotor.

A permanent magnet spiral motor uses a stator that includes a permanent stator magnet having a spiral structure. For example, JP55-144783 describes an example of a known permanent magnet spiral motor including a stator comprising a permanent magnet of a spiral geometry and a rotor drum comprising a permanent rotor magnet, which spans only part of the rotor's circumference. The spiral magnet of the rotor produces an inhomogeneous magnetic gradient thereby exerting a force onto the permanent rotor magnet so that the rotor is accelerated from an initial position up to about. 90% of its rotation cycle without the need of a continuous ac rotor current as required in a conventional permanent magnet motor. In the last part of the cycle, the magnetic rotor part needs to overcome a discontinuity in the magnetic field which is present due to the spiral geometry of the stator magnet and which counteracts the acceleration of the rotor.

A magnetic pulse generator, positioned at the discontinuity, is controlled to produce a magnetic force to start a cycle and to finish a cycle. The magnetic pulse generator may include a coil structure connected to electronics configured to produce a magnetic signal to "push" the rotor magnet away from its initial position to start a rotation cycle and to "attract" the rotor magnet towards the initial position. The need of such magnetic pulse generator to maintain the movement of the rotor however takes away a substantial part of the benefits of the spiral shaped permanent rotor magnet.

Hence, from the above it follows there is a need in the art for improved spiral permanent magnet convertors. In particular, there is a need in the art for improved spiral permanent magnet convertors that provide optimal use of the inhomogeneous magnetic gradient of the permanent spiral magnet of the rotor while eliminating the need of a magnetic pulse generator at the stator side to keep maintain the motion of the rotor.

SUMMARY OF THE INVENTION

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

In a first aspect, the invention may relate a permanent magnet energy converter, which may comprise a stator structure including a stator magnet having a spiral geometry and wherein the stator magnet may have a U-shaped cross-section, wherein a first leg of the U-shaped cross-section may form a first magnetic pole and a second leg of the U-shaped cross-section may form a second magnetic pole.

In an embodiment, the converter may include an elongated rotor structure having a first and second end being positioned within the stator structure, wherein the rotor structure is configured to rotate about a rotation axis.

In an embodiment, the elongated rotor structure may comprise first and second elongated core elements of a magnetizable material.

In an embodiment, the first end and second end of the first core element may be aligned with the first magnetic pole of the stator magnet and a first end and second end of the second core element being aligned with the second magnetic pole of the stator magnet.

In an embodiment, the elongated rotor structure may comprise one or more permanent magnets for magnetizing the first and second elongated core elements.

In an embodiment, the elongated rotor structure may comprise a first magnetic coil structure for reversing the magnetic polarity of the first end of the first and second core elements.

In a further embodiment, the elongated rotor structure may comprise a second magnetic coil structure for reversing the magnetic polarity of the second end of the first and second core elements.

In an embodiment, the converter may further comprise: a current source for controlling a current through the first magnetic coil structure and/or second magnetic coil structure.

In an embodiment, the spiral geometry of the stator magnet structure may be configured to rotate the rotation structure about the rotation axis.

In an embodiment, during rotation of the rotor structure, the distance between the stator magnet and the first end of the first and second core elements will gradually change.

In an embodiment, during rotation of the rotor structure, the first end and second end of the magnetizable core structure may move along the inner surface of the stator structure In an embodiment, during rotation, the distance between the first and second end of the rotor and the inner surface of the stator structure may gradually change, for example decrease.

In an embodiment, the stator magnet may have a spiral geometry, preferably a single spiral, wherein the spiral geometry includes a gap between a first end of stator magnet and the second end of the stator magnet.

In an embodiment, the size of the gap may between 2 and 20% of the circumference of the stator magnet.

In an embodiment, during rotation of the rotor about the rotation axis, the first magnetic coil structure may be controlled to enable rotation of rotor structure such that the first and second end of the rotor passes the gap.

In an embodiment, the one or more permanent magnets may be arranged to magnetize the first and second elongated core elements so that the first end and second end of the first core element are attracted by the first magnetic pole of the stator magnet and the first end and second end of the second core element are attracted by the second magnetic pole of the stator magnet.

In an embodiment, the magnetizable material may include a soft-magnetic cobalt-iron alloy, preferably a 49% cobalt-iron alloy.

In an further aspect, the invention relates to a conversion system comprising: a plurality of permanent magnet energy converters according to any of the embodiments described above.

In an embodiment, the plurality of permanent magnet energy converters may be arranged next to each other and the rotor structures of the plurality of energy converters may be connected to one rotatable axle.

In an embodiment, the length of the magnetizable core structure may be selected such that the distance between the end of the magnetizable core structure and the legs of the U shaped cross-section of the rotor magnet is smaller than the distance between the legs of the U shaped cross-section of the rotor magnet for a substantial part of one rotation of the rotor structure. This way, the rotor structure will experience a torque when it rotates within the stator structure.

In an embodiment, the gap of each of the spiral-shaped stator magnets may be equidistantly arranged around the axis of the rotatable axle.

In an embodiment, the rotor structures may be connected to the rotatable axle such that the radial angle between the longitudinal rotor structures are substantially the same.

In an embodiment, the invention may relate to apply a current to a coil structure of any of the permanent magnet energy converters described above so that a magnetic field is generated that reverses the magnetisation direction in the elongated core elements of the rotor structure. Due to the reversal of the magnetic polarity, the second ends of the first and second rods will be repelled to the magnetic poles of the stator, while the first ends of the first and second rods are still being attracted by the magnetic poles of the stator, thus enabling the rotor to pass the gap.

Additionally, in the nett change of the magnetisation throughout the elongated core elements may induce a current in the second coil structure which can be stored using a battery or the like.

Hence, the energy converter described with reference to the embodiments in this application allow a rotor to rotate using the magnetic field of a stator. For each cycle, two current pulses are need to allow a rotor end to pass the gap of the spiral-shaped rotor magnet. The passage of the gap only constitutes a small part of one rotation cycle. For the rest of the rotation cycle the rotor is power by the magnetic field of the spiral-shaped rotor magnet.

The invention will be further illustrated with reference to the attached drawings, which schematically will show embodiments according to the invention. It will be understood that the invention is not in any way restricted to these specific embodiments.

DETAILED DESCRIPTION

Figure 1:
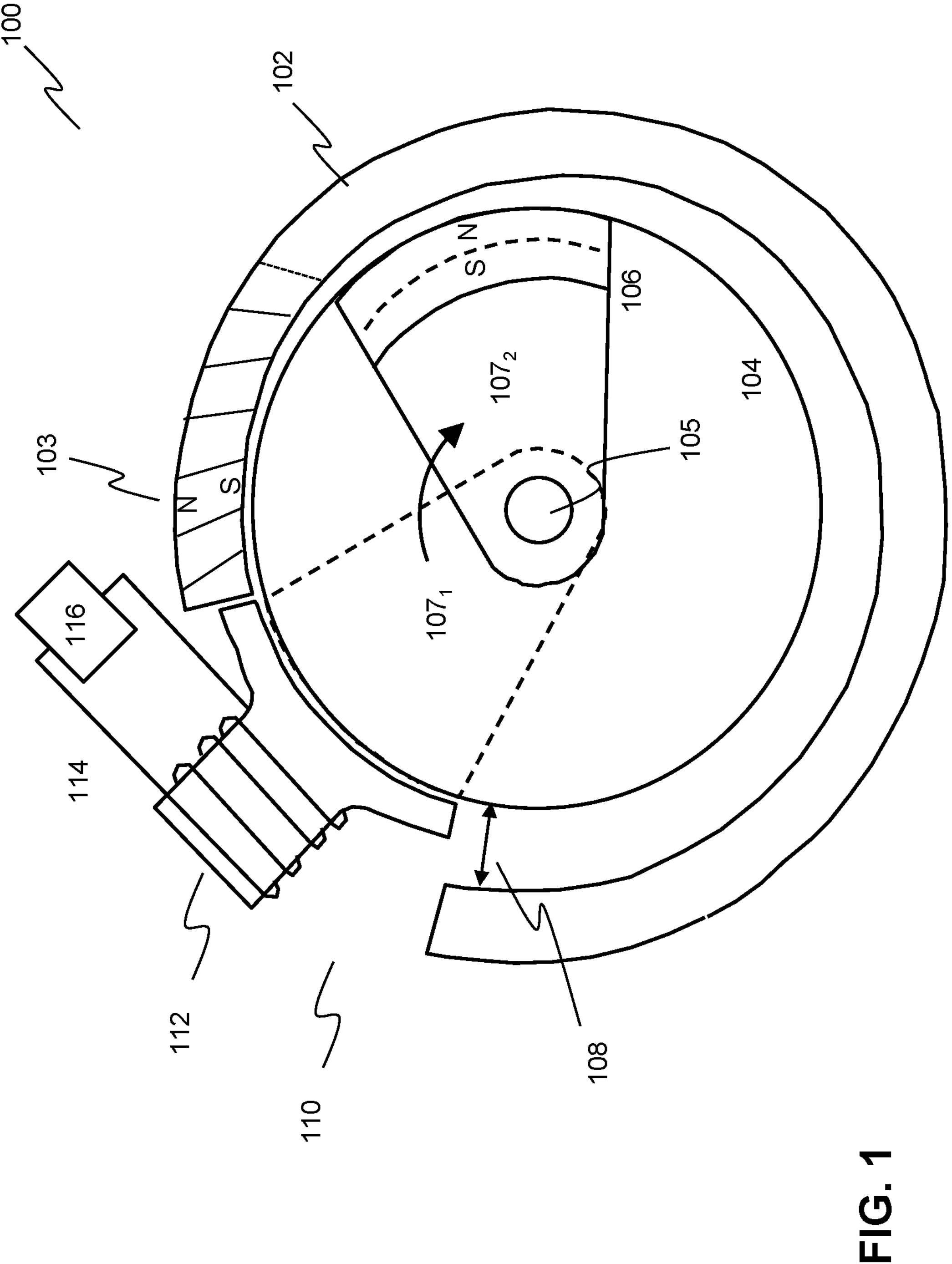
FIG. 1 depicts a permanent magnet motor known from the prior art.

FIG. 1 depicts a permanent magnet motor known from the prior art. The motor 100 includes a stator structure 102 and a rotor structure 104, wherein rotor structure includes a rotatable rotor drum wherein only a part of the circumference of the rotor drum is configured as a permanent magnet 106. The rotor drum is configured to rotate around its rotation axis 105. The permanent rotor magnet may for example span 60 degrees of the rotor's circumference. The stator structure may include a plurality of magnet elements 103 wherein the magnetisation is of each magnet element is arranged in a predetermined orientation so that the inner surface of the rotor either is the north pole or the south pole.

Further, as shown in the figure, the stator structure is not circular but has a spiral geometry. This way the distance between the outer surface of the rotor drum and the inner surface of the rotor magnet gradually changes as a function of the position on the surface of the rotor drum. Moving along the rotation axis of the rotor drum, the distance 108 between the outer surface of the rotor drum and the inner surface of the rotor magnet gradually changes (in this case increases). Hence, when starting from an initial position $\mathbf{107}_1$ the rotor magnet rotates in one rotation cycle around its axis via position $\mathbf{107}_2$ back to the initial position. During this rotation cycle, the distance between rotor magnet and the stator magnet will gradually increase. Due to this distance the rotor will experience a force (a torque), accelerating the rotor magnet from its initial position through approx. 90% of its cycle without the need of a continuous ac rotor current as required in a conventional permanent magnet motor.

The spiral shape of the stator magnet will cause a discontinuity in the magnetic field when performing a full rotation cycle. This discontinuity is positioned at the location wherein the distance between the rotor magnet changes from a large distance to a small distance. The magnetic field at the position of the discontinuity will counter the acceleration of the rotor. In order to deal with this discontinuity, the stator magnet comprises a 'gap' 110 in which a magnetic pulse generator 112 is positioned. The magnetic pulse generator may include a coil structure connected to electronics configured to produce a magnetic signal to "push" the rotor magnet away from its initial position to start a rotation cycle and to "attract" the rotor magnet towards the initial position. The need of such magnetic pulse generator to maintain the movement of the rotor however takes away a substantial part of the benefits of the spiral shaped permanent rotor magnet. The embodiments in this application aim at taking away at least part of the disadvantages known from such conventional permanent magnet spiral motors.

Figure 2:
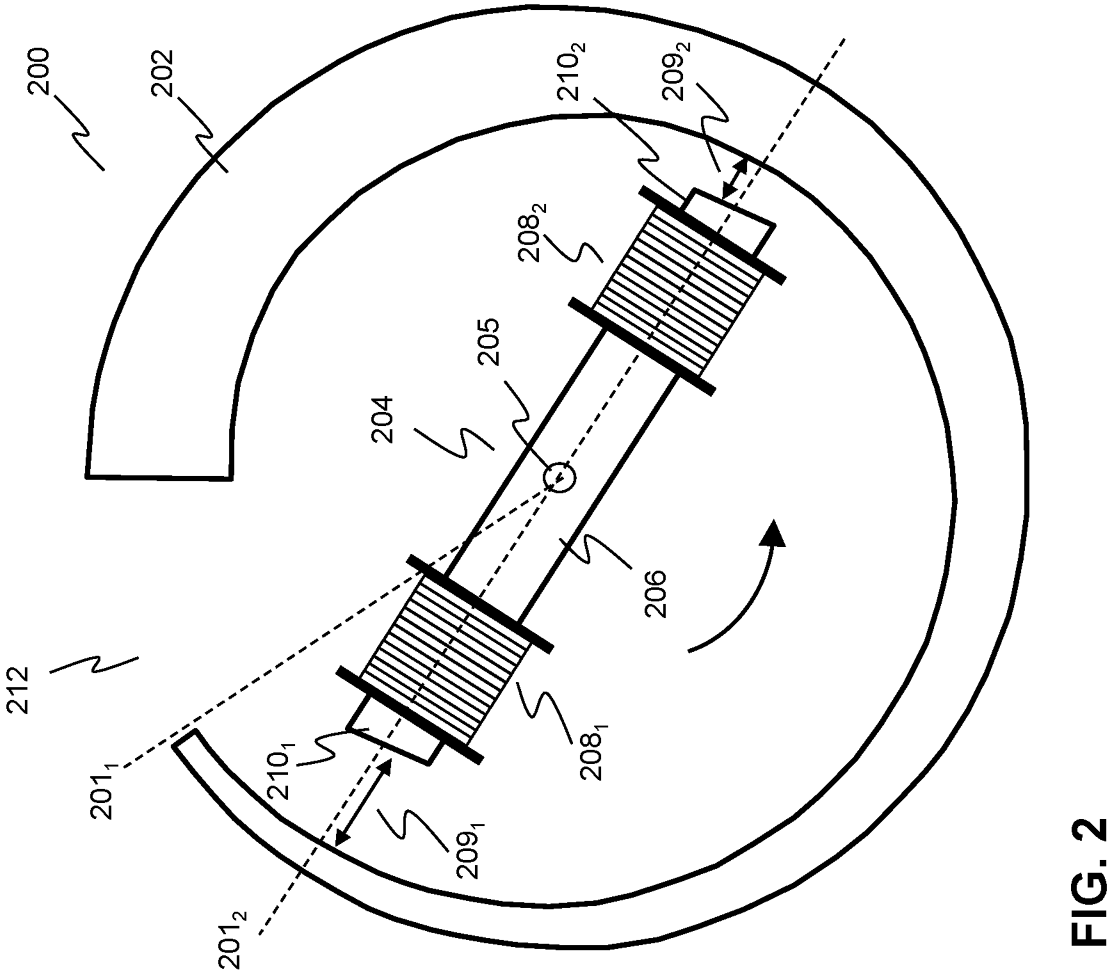
FIG. 2 depict a permanent magnet energy converter according to an embodiment of the invention.

FIG. 2 depicts a permanent magnet energy converter according to an embodiment of the invention. The converter 200 includes a stator structure 202 including a stator magnet that has a spiral geometry. The converter further includes a rotor structure 204 that is positioned within the stator structure 202. The rotor structure 204 is rotatably connected so that it can rotate about rotation axis 205. The rotor structure 204 further comprises a magnetizable core structure 206 comprising at least a first coil structure $\mathbf{208}_1$ at a first end $\mathbf{210}_1$ of the magnetizable core structure 206 and a second coil structure $\mathbf{208}_2$ at a second end $\mathbf{210}_2$ of the magnetizable core structure 206. The rotor structure 204 further includes one or more permanent magnets (not shown) to set the magnetization in the core structure in a predetermined direction. By setting the magnetization in the core structure 206, magnetic interaction between the magnetic field of the stator magnet and the inhomogeneous magnetic field of the rotor magnet causes a net torque so that the rotor will start rotating.

Similar to the stator structure of FIG. 1, the spiral stator magnet of FIG. 2 includes a "gap" which includes a discontinuity in the distance between an end of the rotor and the inner surface of the spiral stator magnetic. This discontinuity will translate in an magnetic field at the location of the gap that will counter rotational movement of the rotor. The gap may be between 2 and 20% of the circumference of the stator magnet.

The stator may be set to an initial rotary position $\mathbf{201}_1$ wherein the distance between the first end of the stator and the stator magnet is maximal. In this position the magnetic interaction between the magnetic field at the first and second end of the rotor and the inhomogeneous magnetic of the rotor magnet will cause the rotor to start rotating around its axis of rotation without the need to apply a current through the coils.

For example, in FIG. 2 the rotor has rotated from the initial position to the position $\mathbf{201}_2$ (with a first distance $\mathbf{209}_1$ between the first end of the rotor and the inner surface of the spiral rotor magnet and a second distance $\mathbf{209}_2$ between the second end of the rotor and the inner surface of the spiral rotor magnet). During rotation, the first end $\mathbf{210}_1$ and second end $\mathbf{210}_2$ of the magnetizable core structure will move along the inner surface of the stator structure wherein the distance between the first and second end of the rotor and the inner surface of the stator structure will gradually change, e.g. decrease. When the second end of the rotor approaches the gap 212 in the spiral stator magnet, the second end $\mathbf{210}_2$ of the rotor will start experiencing a force that counters the rotation that is caused by the inhomogeneous magnetic of the rotor magnet. To minimize this effect, an excitation current is sent through the second coil structure $\mathbf{208}_2$. This will be described in more detail with reference to FIGS. 5 and 6 below.

Figure 3:
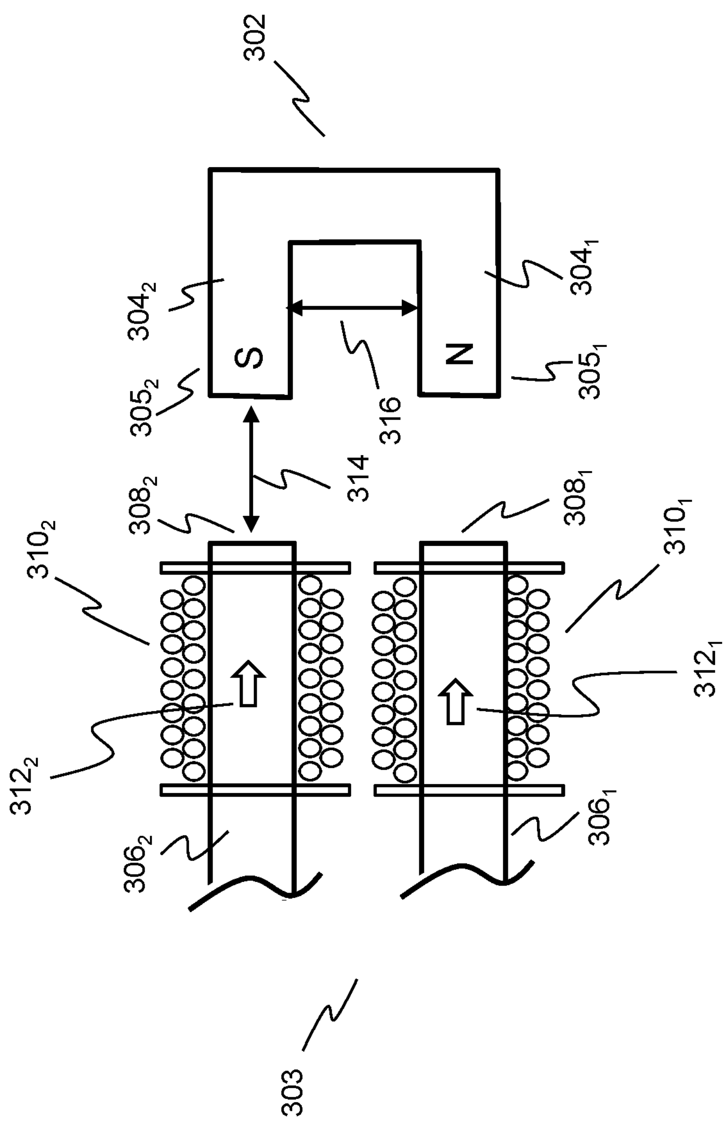
FIG. 3 depict cross-sectional details of a permanent magnet energy converter according to an embodiment of the invention.

FIG. 3 shows a cross-section of part of the converter of FIG. 2. This cross section is taken along the dotted line $\mathbf{201}_2$ in FIG. 2, which defines a radial axis perpendicular to the rotation axis of the rotor and which forms the longitudinal axis of the rotor structure. The figure includes a cross-section of part of the rotor magnet 302, which is constructed as a U-shaped, e.g. a horseshoe shaped, magnet including a first leg $\mathbf{304}_1$ and a second leg $\mathbf{304}_2$ wherein each of the legs defines a magnetic pole. In an embodiment, the spiral rotor magnet may be formed based on a plurality of U-shaped magnets arranged in a spiral around the rotation axis of the rotor as schematically depicted in FIG. 2. This way, the poles $\mathbf{305}_{1,2}$ of the U-shaped magnets are oriented towards (and aligned with) the end parts $\mathbf{308}_{1,2}$ of the rotor structure.

FIG. 3 further shows one end of the magnetizable core structure 303 of the rotor. As shown in this figure, the core structure includes at least two rods $\mathbf{306}_{1,2}$ of a magnetizable material, e.g. iron or the like. Each rod may form an elongated magnetizable core element having a predetermined magnetization $\mathbf{312}_{1,2}$, which may be set by one or more permanent magnets in the stator structure (not shown). Further, the magnetizable core structure includes a coil structure comprising a first coil $\mathbf{310}_1$ arranged around the first magnetizable rod and a second coil $\mathbf{310}_1$ arranged around the second magnetizable rod. As will be described hereunder in greater detail, the magnetization of the rod may be changed by applying a current through the coil structure. The rotor structure is positioned within the spiral stator magnet so that a first end $\mathbf{308}_1$ of the first magnetizable rod is aligned with a first leg (the first magnetic pole) of the U-shaped rotor magnet structure and the end $\mathbf{308}_2$ of the second magnetizable rod is aligned with a second leg (the second magnetic pole) of the U-shaped rotor magnet structure.

In an embodiment, the length of the magnetizable core structure 303 may be selected such that the distance between the end of the magnetizable core structure 314 and the the legs of the U shaped cross-section of the rotor magnet is smaller than the distance 316 between the legs of the U shaped cross-section of the rotor magnet for a substantial part of one rotation of the rotor structure. This way, the rotor structure will experience a torque when it rotates within the stator structure. This process will be described in more detail below.

Figure 4:
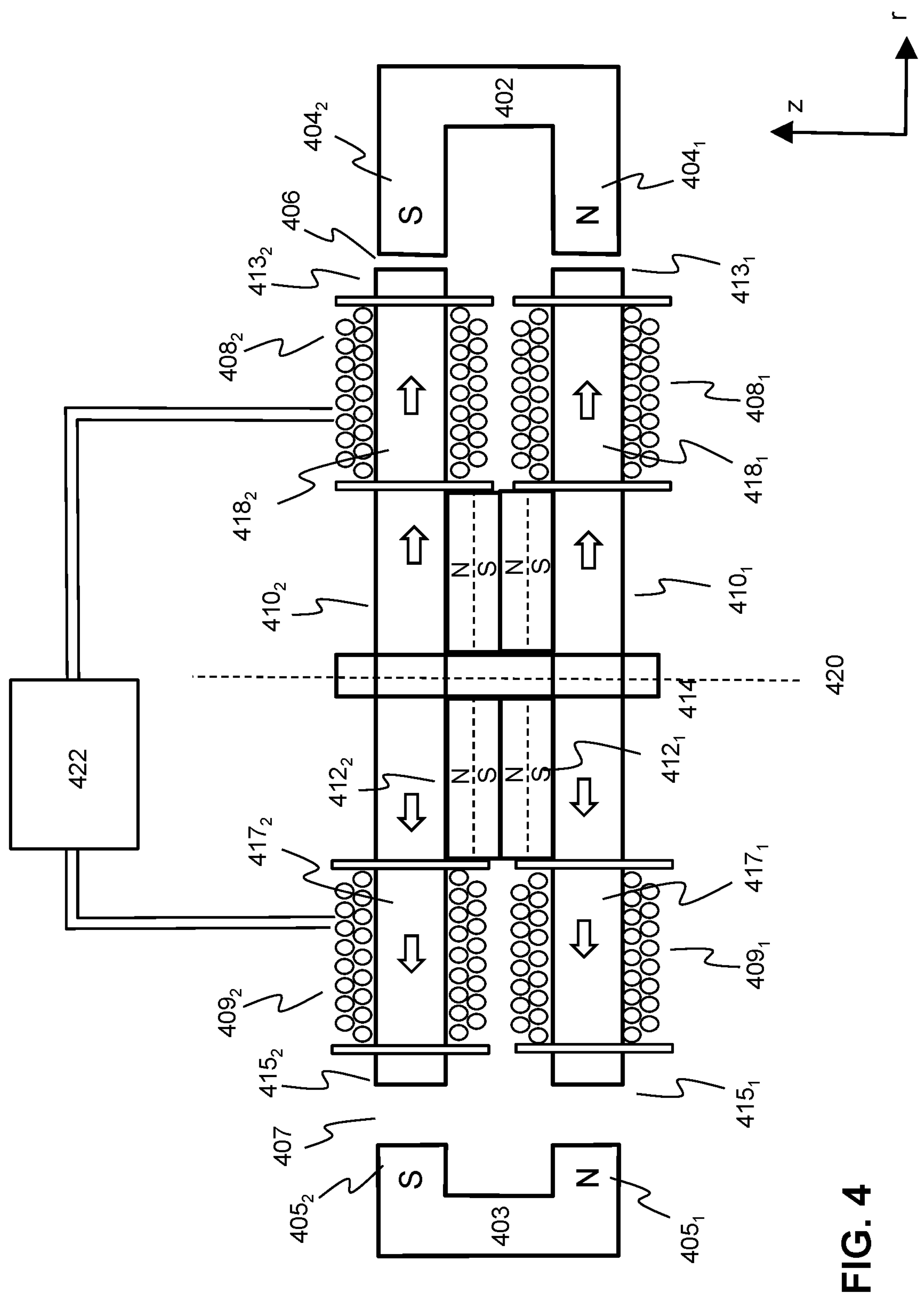
FIG. 4 depicts a cross-section of a permanent magnet energy converter according to an embodiment of the invention.

FIG. 4 depicts a cross-section of a permanent magnet energy converter according to an embodiment of the invention. In particular, the figures depicts a cross-section of the energy converter as described with reference to FIG. 2, wherein the convertor comprises a stator structure comprises a spiral stator magnet, i.e. a magnet that has a spiral geometry for producing an inhomogeneous magnetic gradient. The converter further includes a rotor structure including a magnetizable core structure comprising a first rod $\mathbf{410}_1$ (a first elongated magnetizable core element) and second rod $\mathbf{410}_2$ (a second elongated magnetizable core element) of a magnetizable material. The rotor structure may be rotatably mounted within the stator structure using a rotatable shaft 414, which may have a rotation axis 420 parallel to the z-axis. Further, the longitudinal axis of the magnetizable core structure and the legs of the U-shaped magnets may be arranged in a radial direction r perpendicular to the z-axis.

As already described with reference to FIG. 3, a first end of the magnetizable core structure (first ends $\mathbf{413}_{1,2}$ of the first and second rod of magnetizable material) may be magnetically coupled to a first U-shaped magnet 402 of the stator structure. Similarly, a second end of the magnetizable core structure (second ends $\mathbf{415}_{1,2}$ of the first and second rod of magnetizable material) may be magnetically coupled to a second U-shaped magnet 403 of the stator structure. To that end, a longitudinal axis of the magnetizable rods $\mathbf{410}_{1,2}$ of the rotor structure may be aligned with the longitudinal axis of the legs of the U-shaped magnets of the stator structure. Further, an air gap 406,407 may be present between the poles of the U-shaped magnets of the stator structure and an end of the magnetizable core structure. The spiral geometry of the stator magnet may have the effect that the width of the air gap 406 between the first U-shaped magnet 402 and the first end of the magnetizable core $\mathbf{413}_{1,2}$ may be different from the width of the air gap 407 between the second U-shaped magnet 403 and the second end $\mathbf{415}_{1,2}$ of the magnetizable core. Similarly, the length of the legs $\mathbf{405}_{1,2}$ of the first U-shaped magnets and the length of the legs $\mathbf{404}_{1,2}$ of the second U-shaped magnets may be different.

The magnetic coupling between poles of the U-shaped magnets and the first and second end of the magnetizable core structure may be controlled using one or more permanent magnets $\mathbf{412}_{1,2}$. These magnets may be used to control the magnetization in the rods. One or more permanent magnets may be arranged at a first side of the rotation axis. These magnets may cause a predetermined magnetization direction $\mathbf{417}_{1,2}$ in the rods at the first side of the magnetic axis. Similarly, one or more permanent magnets may be arranged at a second side of the rotation axis to form a predetermined magnetisation direction $\mathbf{418}_{1,2}$ in the rods at the second side of the rotation axis.

For example, first coupling magnet $\mathbf{412}_1$ may include a first end defining a magnetic pole (in this case the south pole) connected to the surface of a first part of first magnetizable rod $\mathbf{410}_1$. This way, the magnetic pole $\mathbf{405}_1$ of the U-shaped magnet and the magnetic pole of the first coupling magnet $\mathbf{412}_1$ will cause a predetermined magnetization direction $\mathbf{417}_1$ in the first part of the first rod $\mathbf{410}_1$. In a similar way, areas in the first and second part of the first and second rods will be formed that have a predetermined magnetization direction. In the situation of FIG. 4, both at the first and second side of the rotation axis the magnetic poles of the stator magnet are nicely aligned via the rods to the magnetic poles of the rotor magnet.

The magnetization direction of these areas may be manipulated by the coil structures $\mathbf{408}_{1,2}$ and $\mathbf{409}_{1,2}$ which are connected to a computer-controlled current source. By sending a current through one of these magnetic coils, a magnetic field may be generated by the coil that has a direction that is opposite to the direction of the magnetization of the rod close to the magnetic coil. This way, the magnetic interaction between the magnetic field of the stator and the magnetic field of the rotor may be controlled.

Figure 5:
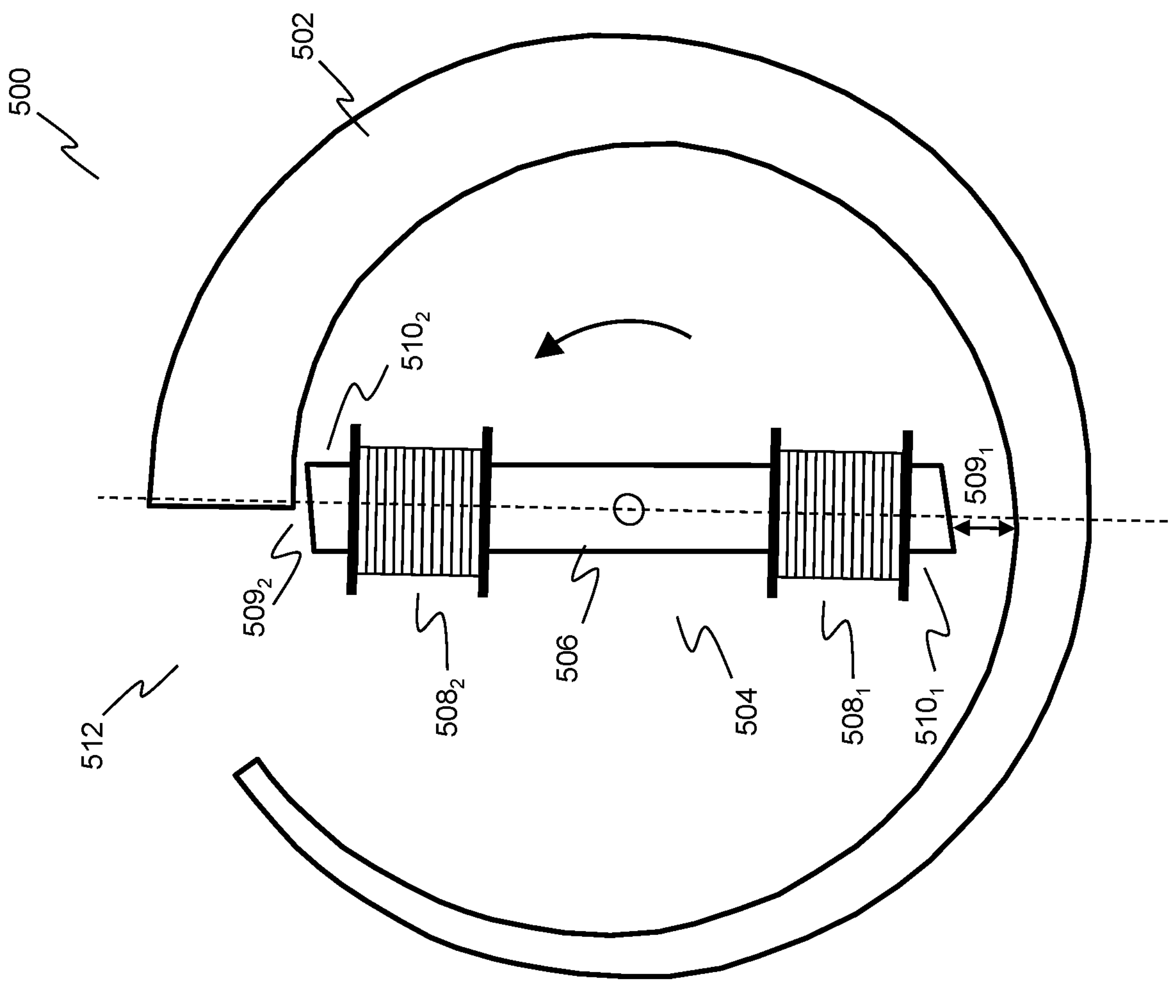
FIG. 5 depict a permanent magnet energy converter according to an embodiment of the invention.

The control of the magnetic interaction between the stator and rotor using the magnetic coils is particular advantageous when one end of the rotating stator approaches the gap as e.g. depicted in FIG. 5. This figure is similar to FIG. 2 with the difference that the position of the stator 504 is such that the second end $\mathbf{510}_2$ of the stator is close to the gap 512 (or when the distance $\mathbf{510}_2$ between the second end of the rotor and the inner surface of the rotor magnet is minimal) it will start experiencing a magnetic force that counters the rotation of the rotation. Hence, at this position a current may be applied to the second coil $\mathbf{508}_2$ to change the interaction between the magnetic field of the stator.

Figure 6:
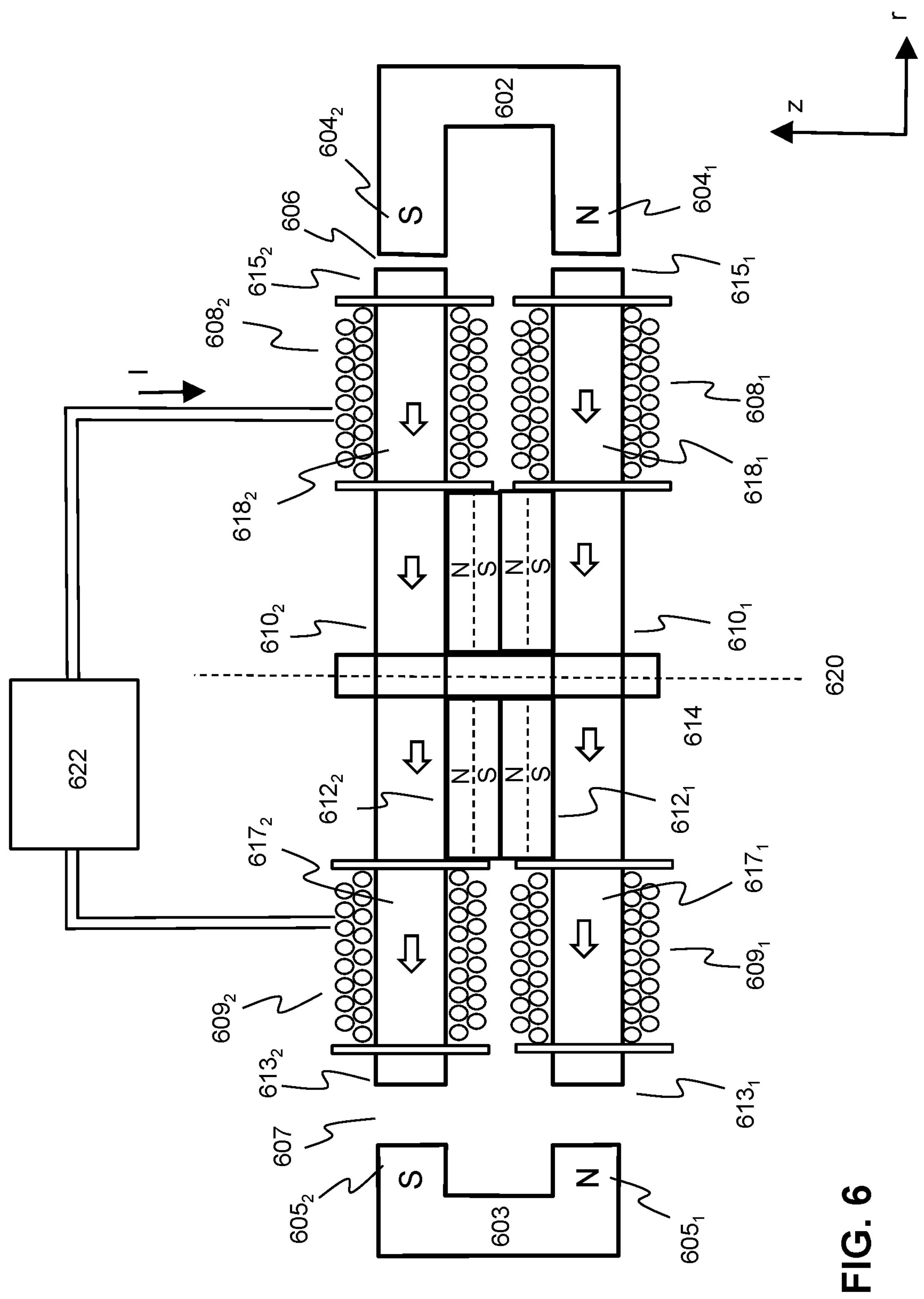
FIG. 6 depicts a cross-section of a permanent magnet energy converter according to an embodiment of the invention.

This change in magnetic interaction at both ends of the stator is illustrated in FIG. 6 in more detail. This figure depicts a cross-section of a permanent magnet spiral energy converter that includes a structure that is similar to the one described with reference to FIG. 4. In this particular embodiment, however a current is applied to coil structure $\mathbf{608}_{1,2}$ so that it will generate a magnetic field in rods that reverses the magnetisation direction $\mathbf{618}_{1,2}$ in the second part of the first and second rods $\mathbf{610}_{1,2}$. Due to the reversal of the magnetic polarity, the second ends of the first and second rods will be repelled to the magnetic poles of the stator, while the first ends of the first and second rods are still being attracted by the magnetic poles of the stator, thus enabling the rotor to pass the gap. Additionally, the net change of the magnetisation throughout the rods may induce a current in the unloaded second coil structure $\mathbf{608}_{1,2}$ can be stored using a battery and used for applying further current pulses.

Hence, the energy converter described with reference to the embodiments in this application allow a rotor to rotate using the magnetic field of a stator. For each cycle, current pulses, e.g. two current pulses, are need to allow a rotor end to pass the smallest gap of the spiral-shaped magnet. These current pulses may be timed such that they are applied when the ends of the rotor pass the smallest gap. The passage of the gap only constitutes a small part of one rotation cycle. For the rest of the rotation cycle the rotor is power by the magnetic field of the spiral-shaped rotor magnet.

In an embodiment, certain magnetizable materials may be used to improve the efficiency of the converters described with in this application. For example, instead of conventional magnetizable materials such as iron, magnetizable material having a high magnetic saturation may be used. For example, in an embodiment, soft-magnetic cobalt-iron alloys characterized by a high magnetic saturation e.g. up to 1.5 Tesla, preferably up to 2 Tesla, more preferably up to 2.3 Tesla may be used. For example, in an embodiment, 49% cobalt-iron alloy may be selected as the magnetizable materials for the rotor. These materials may include 49% cobalt, 49% iron, and some other components such as V, Nb, Cr, Ta, Zr, Mn or Al. These materials are particular suitable for use in an environment with high magnetic fields and have advantageous weight properties. These type of materials allow efficient reversal of the magnetization in the core of the rotor. This way, smaller currents (up to 20-40% less compared to the use of conventional iron materials) may be used to change the direction of the magnetic field using the coil structures. Additionally, the high magnetic saturation characteristics of these materials will result in a higher torque that is applied to the rotor resulting in an improved output (in terms of mechanical energy) and higher number of rotations per unit of time.

Figure 7A:
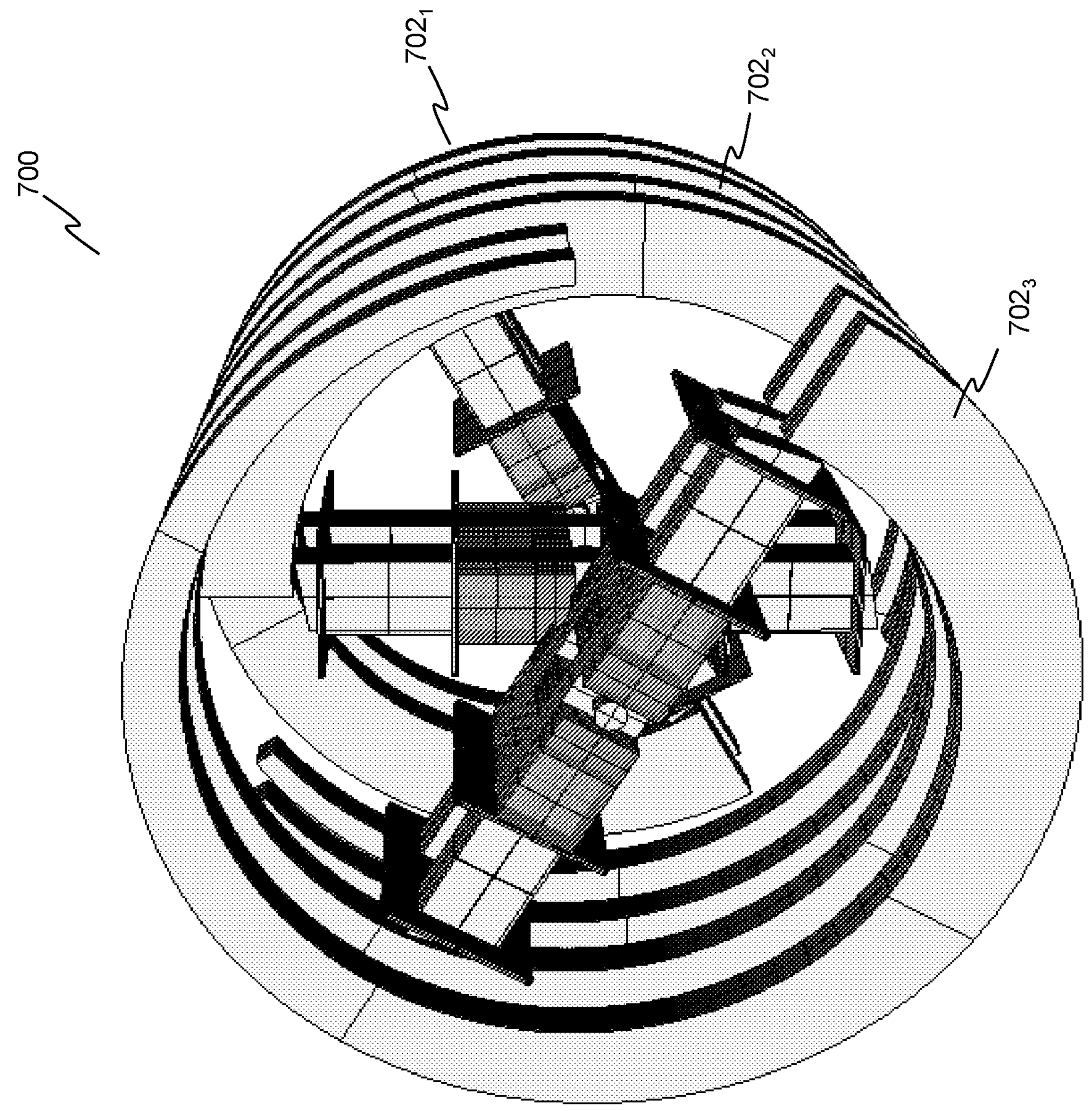
FIG. 7A schematically depicts a perspective view of an energy conversion system according to one or more embodiments of the invention.
Figure 7B:
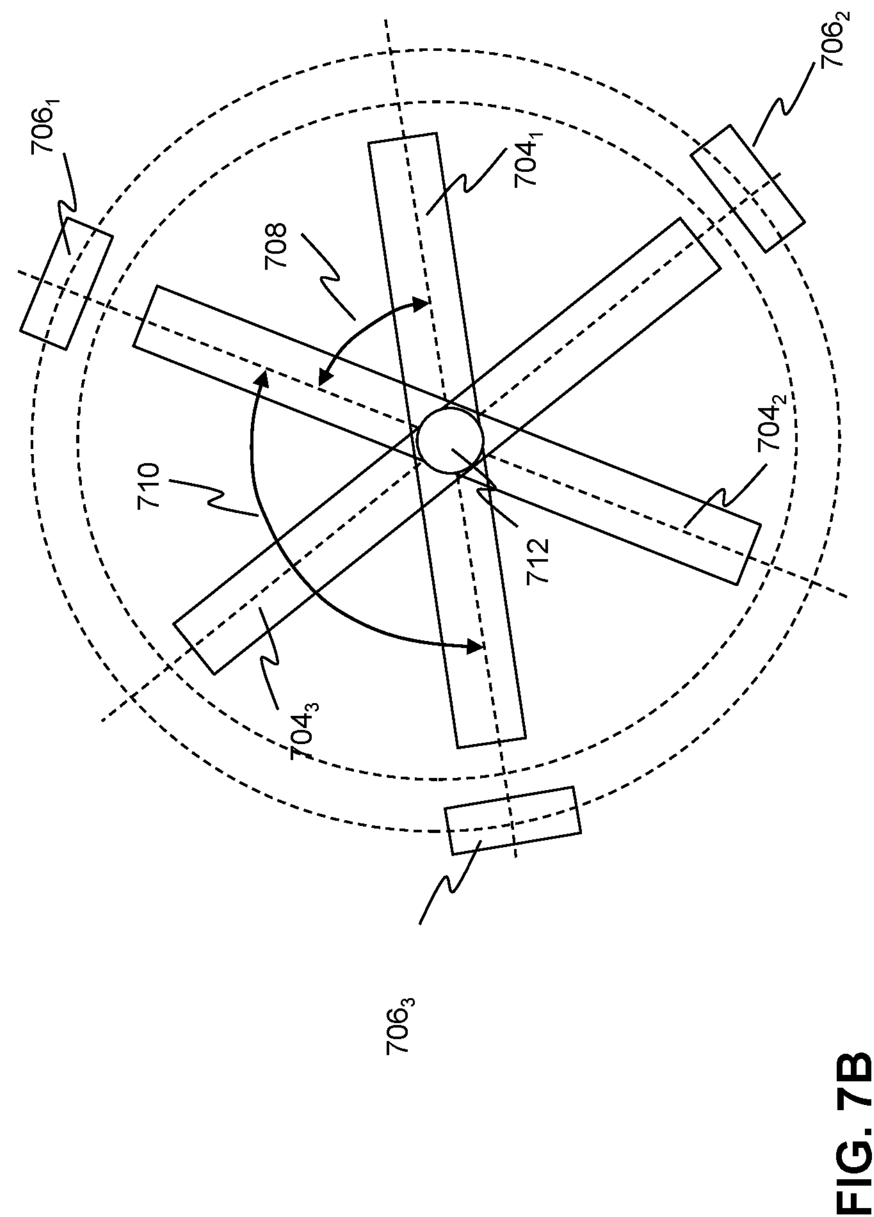
FIG. 7B schematically depicts an axial view of an energy conversion system according to one or more embodiments of the invention.

In order to reduce large fluctuations in the force or torque experienced by the rotor due to the gap in the spiral shaped stator magnet, a number of permanent magnet energy converters may be arranged next to each other in the direction of the rotation axis. An example of such energy conversion system according to an embodiment of the invention is depicted in FIGS. 7A and 7B. In particular, FIG. 7A depicts a 3D figure of an energy conversion system including a plurality, in of permanent magnet energy converters $\mathbf{702}_{1\text{-}3}$ according to any of the embodiments described in this application. As shown in this figure, each energy converter may include a stator structure including a stator magnet that has a spiral geometry and a rotor structure position within the stator structure as e.g. described with reference to FIG. 2 above. The plurality of permanent magnet energy converters may be arranged next to each other along their rotational axis. Further, the rotor structures may mounted onto a common rotatable axle.

To reduce large fluctuations in the force or torque experienced by the rotor due to the gap in the spiral shaped stator magnet, the spiral stator magnets are arranged such that gaps are equidistantly arranged around the axis of rotation as schematically depicted in FIG. 7B. This figures depicts a schematical cross-sectional view of the system including an axle 712 comprising a plurality of rotors $\mathbf{702}_{1\text{-}3}$ and a plurality of stators, each including a spiral shaped stator magnet (not shown) having a gap $\mathbf{706}_{1\text{-}3}$. The spiral shaped stator magnets are arranged equidistantly form each other (in radial direction). For example, in FIG. 3 the radial angle 710 between the gaps is 120 degrees. Similarly, the status structures are mounted on the common axle such that the radial angle 708 between the longitudinal axis of the stator structures is 60 degrees. Although the figures depicts an system comprising three energy converters, the invention is not limited thereto and any other number of energy converters may be used as well.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An energy conversion system comprising a plurality of permanent magnet energy convertors arranged next to each other along their rotational axis, wherein said permanent magnet energy converters each comprise:

a circumferential stator structure including a stator magnet having a spiral geometry, wherein the stator magnet has a U-shaped cross-section and comprises a plurality of U-shaped magnets, such that a first leg of the U-shaped cross-section forms a first magnetic pole and a second leg of the U-shaped cross-section forms a second magnetic pole; and an elongated rotor structure positioned within the circumferential stator structure and configured to rotate about a rotational axis, the elongated rotor structure having a first end and a second end, wherein:

the elongated rotor structure comprises a first elongated core element and a second elongated core element;

the first elongated core element and the second elongated core element are formed from a magnetizable material;

both ends of the first elongated core element are aligned with the first magnetic pole of the stator magnet;

both ends of the second elongated core element are aligned with the second magnetic pole of the stator magnet;

the elongated rotor structure further comprises at least one permanent magnet arranged to magnetize each of the first elongated core element and the second elongated core element, such that both ends of the first elongated core element are attracted to the first magnetic pole of the stator magnet and both ends of the second elongated core element are attracted to the second magnetic pole of the stator magnet;

the elongated rotor structure further comprises a first magnetic coil structure for reversing a magnetic polarity of a first end of the first elongated core element and the second elongated core element, and the elongated rotor structure further comprises a second magnetic coil structure for reversing a magnetic polarity of a second end of the first elongated core element and the second elongated core element;

a gap is present between the rotor structure and the circumferential stator structure, such that a width of the gap varies about a circumference of the circumferential stator structure; and the width of the gap varies between a minimal gap and a maximal gap.

2. The energy conversion system according to claim 1, further comprising a current source for controlling current pulses through the first coil structure and the second coil structure.

3. The energy conversion system according to claim 2, wherein the current source is computer-controlled.

4. The energy conversion system according to claim 2, wherein the current pulses are timed such that they are applied when an end of the elongated rotor structure passes the minimal gap.

5. The energy conversion system according to claim 1, wherein the magnetizable material of the first elongated core element and the second elongated core elements is made of a soft-magnetic cobalt-iron alloy with a magnetic saturation up to 1.5 Tesla.

6. The energy conversion system according to claim 5 wherein the magnetizable material comprises 49% by weight cobalt, 49% by weight iron and a balance of one or more other component selected from vanadium, niobium, chromium, tantalum, zirconium, manganese, aluminum, or a combination thereof.

7. The energy conversion system according to claim 6, wherein the circumferential stator structures are clocked relative to one another such that the minimal gaps are separated by a radial angle of 120 degrees.

8. The energy conversion system according to claim 1, further comprising a common rotatable axle to which each of the elongated rotor structures is mounted.

9. The energy conversion system according to claim 1, wherein the circumferential stator structures are clocked relative to one another such that the minimal gaps are equidistantly arranged about the rotation axis.

10. The energy conversion system according to claim 1, wherein the plurality of permanent magnet energy convertors is three permanent magnet energy convertors.

* * * * *